(12) United States Patent
Lee

(10) Patent No.: US 9,246,520 B2
(45) Date of Patent: Jan. 26, 2016

(54) WIDEBAND AND MULTI-BAND FREQUENCY UP CONVERTER

(71) Applicant: XMW INC., Daejeon (KR)

(72) Inventor: Moo Hong Lee, Daejeon (KR)

(73) Assignee: XMW INC., Daejeon (KR)

( * ) Notice: Subject to any disclaimer, the term of this patent is extended or adjusted under 35 U.S.C. 154(b) by 0 days.

(21) Appl. No.: 14/518,005

(22) Filed: Oct. 20, 2014

(65) Prior Publication Data

US 2015/0365111 A1 Dec. 17, 2015

(30) Foreign Application Priority Data

Jun. 16, 2014 (KR) ........................ 10-2014-0072741

(51) Int. Cl.
*H04B 1/00* (2006.01)
*H04B 7/155* (2006.01)
*H04W 72/04* (2009.01)

(52) U.S. Cl.
CPC .......... *H04B 1/0078* (2013.01); *H04B 7/15535* (2013.01); *H04W 72/0453* (2013.01)

(58) Field of Classification Search
CPC ... H04B 1/1036; H04B 1/0096; H04B 1/0078
USPC ........ 455/323, 76, 183.1, 260, 255, 118, 130, 455/75, 78, 256
See application file for complete search history.

(56) References Cited

U.S. PATENT DOCUMENTS

| | | | | |
|---|---|---|---|---|
| 7,263,133 B1* | 8/2007 | Miao | .................. | H04B 1/71632 370/208 |
| 8,509,714 B2* | 8/2013 | Kim | ..................... | H03F 1/0244 455/118 |
| 2004/0062216 A1* | 4/2004 | Nicholls | .................. | H04B 1/71 370/320 |
| 2008/0268806 A1* | 10/2008 | Durtschi | .............. | H04B 1/0021 455/313 |
| 2011/0105068 A1* | 5/2011 | Reddy | .................. | H04B 1/0014 455/207 |

* cited by examiner

*Primary Examiner* — John J Lee
(74) *Attorney, Agent, or Firm* — Paratus Law Group, PLLC

(57) ABSTRACT

Disclosed is a wideband and multi-band frequency up converter used in a satellite earth station. The converter includes a first mixer configured to mix an intermediate frequency (IF) signal and a first local signal, and generate an IF' signal; a narrow band filter configured to filter the IF signal; a first local oscillator configured to generate a first local signal so that the IF' signal passes the narrow band filter; a second local oscillator configured to generate a second local signal needed to convert the IF' signal into a desired frequency (RF) band; a second mixer configured to mix the IF' signal filtered in the narrow band filter and the second local signal, and generate an RF signal; a wideband filter configured to filter the generated RF signal; and a control unit configured to vary a frequency of the first local signal.

4 Claims, 2 Drawing Sheets

WIDEBAND AND MULTI-BAND FREQUENCY UP CONVERTER

CROSS-REFERENCE TO RELATED APPLICATION

This application claims priority to and the benefit of Korean Patent Application No. 2014-0072741, filed on Jun. 16, 2014, the disclosure of which is incorporated herein by reference in its entirety.

BACKGROUND

1. Field of the Invention

The present invention relates to a wideband and multi-band frequency up converter, and more particularly, to a wideband and multi-band frequency up converter capable of minimizing unwanted spurious components of a radio frequency (RF) signal by using a wideband as a passband of a single secondary filter in a double frequency conversion structure.

2. Discussion of Related Art

With the development of electronic technology, various types of electronic devices or apparatuses have been developed and used, a communication device is one of them.

The communication devices and apparatuses are being used for transmitting and receiving a signal between apparatuses in various fields, and recently, as communication technology rapidly develops, satellite communications are generally used so that a subscriber located in a remote area performs communication through a satellite.

Conventionally, a satellite communication system allows subscribers located in the remote areas to transmit and receive audio or data through a geostationary satellite installed at the height of 36,000 km, a satellite earth station located on the ground uses a high-power and super-high frequency as an uplink signal in order to communicate with the satellite located in the sky, and when a power level of the uplink signal transmitted to the satellite is small, a signal to noise ratio is decreased, reception sensitivity is degraded, or communication is disconnected.

Accordingly, various technologies are being developed in order to increase the power level of a transmission signal of a satellite earth station, and for example, there is Patent Reference 1. However, in order to generate a wideband and multi-band signal of a frequency band over 2 GHz using conventional technology, a plurality of local oscillators and output circuits are connected in parallel, and a switch for selecting a desired band is needed. Accordingly, when generating the wideband and multi-band signal using the frequency up converter (a transmitter) used in the conventional satellite earth station, there are problems in which a circuit becomes complicated and also costs are increased since a size of the satellite earth station transmitter is large.

SUMMARY OF THE INVENTION

The present invention is directed to a wideband and multi-band frequency up converter capable of minimizing spurious components of a radio frequency (RF) signal by using a wideband as a passband of a single secondary filter in a frequency converter structure used in a satellite earth station.

The present invention is further directed to a wideband and multi-band frequency up converter capable of providing a precise output level by correcting an error generated when measuring the output level of the wideband and multi-level frequency up converter.

According to an aspect of the present invention, there is provided a wideband and multi-band frequency up converter, including: a first mixer configured to mix an intermediate frequency (IF) signal and a first local signal, and generate an IF' signal; a narrow band filter configured to filter the IF' signal using a predetermined passband wherein the narrow band filter which is a band pass filter (BPF) uses a frequency of the IF' signal as a center frequency; a first local oscillator configured to generate a first local signal so that the IF signal passes the narrow band filter; a second local oscillator configured to generate a second local signal needed to convert the IF' signal into a desired frequency (RF) band; a second mixer configured to mix the IF' signal filtered in the narrow band filter and the second local signal, and generate an RF signal; a wideband filter configured to filter the generated RF signal, and use at least two RF bands as a passband; and a control unit configured to vary a frequency of the first local signal so that the IF' signal corresponds to the passband of the narrow band filter, and vary a frequency of the second local signal needed to convert the IF' signal passed through the narrow band filter into the desired RF band.

Further, the wideband and multi-band frequency up converter may further include: a coupler configured to extract a signal of a predetermined ratio from the RF signal wherein the predetermined ratio is varied according to the RF frequency of the RF signal; a detector configured to output a first value corresponding to the signal of the predetermined ratio extracted by the coupler; and a corrector configured to correct the first value output from the detector as a second value according to the RF frequency, wherein the control unit monitors an output level of the RF signal using the second value generated by the corrector.

As an embodiment, the first value may be a voltage, and the corrector may include an amplifier and generate the second value by correcting a gain value of the amplifier according to the RF frequency.

As an embodiment, the first value may be a voltage, and the corrector may generate the second value by adjusting a ratio of a voltage value of the first value according to the RF frequency.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Figure 1:
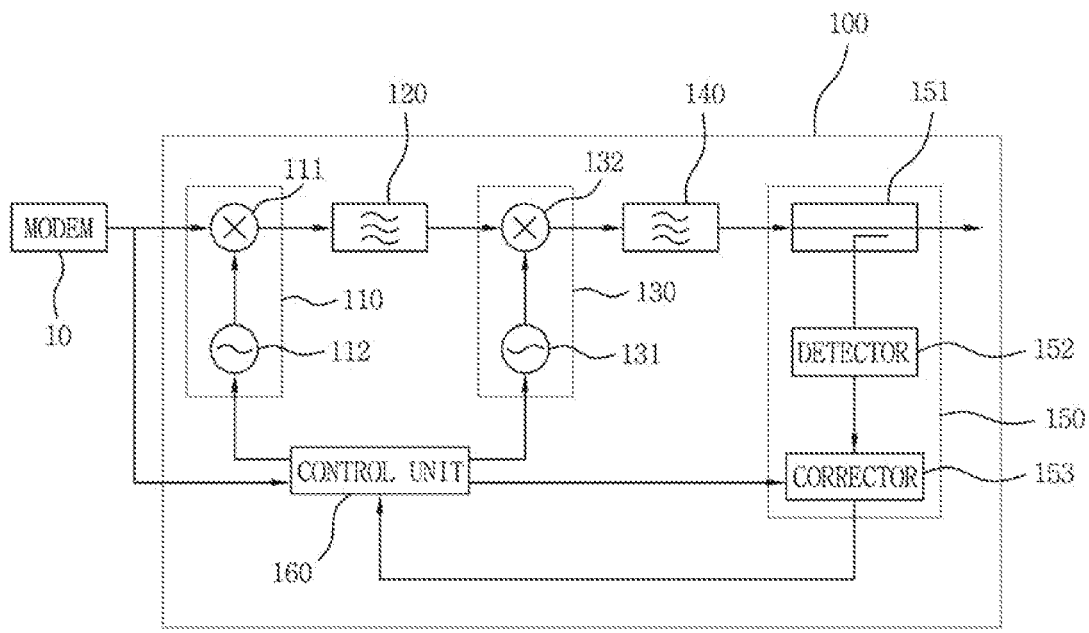
FIG. 1 is a functional block diagram illustrating a configuration of a frequency up converter according to one embodiment of the present invention.

The present invention may be variably modified and have various embodiments, specific embodiments are illustrated in accompanying drawings and will be described in the detailed description of exemplary embodiments. However, the exemplary embodiments described herein are not intended to limit the concept of the present invention, and should be understood as including every modification, equivalent, and alternative included in the spirit and scope of the present invention Similar numerals refer to similar components in the accompanying drawings. In the description of the present invention, when it is determined that a detailed description of the related art makes the gist of the present invention obscure, the detailed description thereof will be omitted.

It will be understood that, although the terms "first," "second," etc. may be used herein in reference to elements of the present invention, such elements should not be construed as limited by these terms. Such terms are used only to distinguish one element from another element.

For example, a first element could be termed a second element, and a second element could be termed a first element, without departing from the scope of the present invention.

The term "and/or" includes any and all combinations of one or more of the associated listed items.

It will be understood that when an element is referred to as being "connected" or "coupled" to another element, the element can be directly connected or coupled to the other element or intervening elements may be present.

In contrast, when an element is referred to as being "directly connected" or "directly coupled" to another element, there are no intervening elements.

The terminology used herein to describe embodiments of the invention is not intended to limit the scope of the invention.

The articles "a," "an," and "the" are singular in that they have a single referent, however, the use of the singular form in the present document should not preclude the presence of more than one referent. In other words, elements of the invention referred to in the singular may number one or more, unless the context clearly indicates otherwise. It will be further understood that the terms "comprises," "comprising," "includes," and/or "including," when used herein, specify the presence of stated features, items, steps, operations, elements, and/or components, but do not preclude the presence or addition of one or more other features, items, steps, operations, elements, components, and/or groups thereof.

Unless otherwise defined, all terms (including technical and scientific terms) used herein are to be interpreted as is customary in the art to which this invention belongs.

It will be further understood that terms in common usage should also be interpreted as is customary in the relevant art and not in an idealized or overly formal sense unless expressly so defined herein.

Hereinafter, a wideband and multi-band frequency up converter according to embodiments of the present invention will be described with reference to FIGS. 1 to 5. In the following descriptions, descriptions with respect to conventional known technology will be omitted or simplified in order to clarify the subject matter of the present invention.

Generally, the C-band (3 to 7 GHz band), the X-band (7 to 9 GHz band), the Ku-band (12 to 15 GHz band), the Ka-band (20 to 31 GHz band), etc. may be used as a radio frequency (RF) band for satellite communication. An intermediate frequency (IF) band such as 950 to 1450 MHz, 950 to 1700 MHz, etc. may be used according to a satellite service method and type.

Recently, there has been a trend in which the IF band of 950 to 1950 MHz is used for a wideband Internet service. For example, for a high-speed Internet service using a satellite, a satellite communication earth station may use a 950 to 1950 MHz band as the IF and the Ka band (20 to 31 GHz band) as the RF frequency.

The frequency up converter of the present invention may upconvert the IF into a RF sub-band selected among various RF sub-bands of the Ka band (20 to 31 GHz band) when the IF bandwidth is equal to or less than 500 MHZ.

Figure 2:
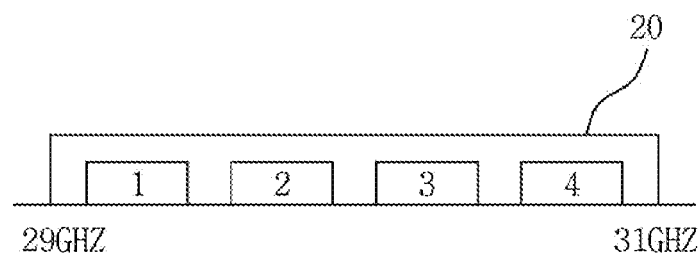
FIG. 2 is a diagram for explaining sub-bands constituting a wide radio frequency (RF) band used in a wideband and multi-band frequency up converter according to one embodiment of the present invention.

Hereinafter, for convenience of description, as shown in FIG. 2, assume that the RF band is a 29 to 31 GHz band. Referring to FIG. 2, the RF band may include a plurality of RF sub-bands 1 to 4 each having a bandwidth which is equal to or less than 500 MHz.

A satellite transmitter in which use of the selected RF sub-band among the plurality of RF sub-bands 1 to 4 is allowed may upconvert one among the IF bands such as the 950 to 1450 MHz band, the 950 to 1700 MHz band, the 950 to 1950 MHz band, etc. into the selected RF sub-band among the plurality of RF sub-bands. The satellite transmitter may be used by changing the RF sub-bands.

For example, when a ship including a wireless communication system that uses a satellite moves from a position A to a position B, the frequency up converter may use the RF sub-bands corresponding to the B position.

Referring to FIG. 1, the frequency up converter 100 may include a first frequency conversion unit 110, a narrow band filter unit 120, a second frequency conversion unit 130, a wideband filter unit 140, a correction unit 150, and a control unit 160.

The first frequency conversion unit 110 may include a first mixer 111 and a first local oscillator 112.

The first mixer 111 may mix an intermediate frequency (IF) signal output from a modem 10 and a first local signal output from the first local oscillator 112, and generate an IF' signal. The frequency of the IF' signal may be Lo1+IF, where Lo1 may be a frequency of a first local signal, and IF may be a frequency of the IF signal.

The control unit 160 may generate a control signal for varying the frequency Lo1 of the first local signal so that the frequency Lo1+IF of the IF' signal output from the first mixer 111 corresponds to a predetermined passband of the narrow band filter unit 120. The first local oscillator 112 may generate a local signal having a specific local frequency corresponding to the control signal of the control unit 160 within a predetermined wideband local frequency band. The first local oscillator 112 may be a voltage controlled oscillator that varies an output frequency according to a voltage. The control unit 160 may vary a frequency of the local signal output from the first local oscillator 112 by varying the voltage input to the first local oscillator 112 according to the frequency of the IF signal.

The narrow band filter unit 120 may filter the IF' signal output from the first frequency conversion unit 110. Here, the narrow band filter unit 120 may be a band pass filter (BPF) having the IF' signal as a center frequency. The narrow band filter unit 120 may completely remove unwanted spurious components outside the band of the IF' signal by adjusting a quality factor.

Meanwhile, the second frequency conversion unit 130 may include a second local oscillator 131 and a second mixer 132.

The second local oscillator 131 may generate a second local signal by varying a frequency Lo2 of the second local signal according to the control of the control unit 160. The frequency of an RF signal may be varied by varying the frequency of the second local signal.

The second mixer 132 may generate the RF signal by mixing the IF' signal filtered in the narrow band filter unit 120 and the second local signal. The frequency of the RF signal may be IF'+Lo2.

The RF band may be varied according to the frequency of the second local signal. That is, the second mixer 132 may output an RF signal of a desired frequency band by varying the frequency of the second local signal according to a selected RF band. Information of the selected RF band may be automatically obtained from the modem 10 or an external input.

The wideband filter unit 140 may filter the RF signal generated by the second mixer 132. At this time, the wideband filter 140 may be set to have at least two RF bands. The wideband filter 140 may be implemented with a single filter. The wideband filter 140 may filter the RF signal output from the second mixer using a frequency included in the selected band of the at least two RF bands.

The wideband filter unit 140 may be implemented with one wideband filter, but as described above, since spurious components (including 2IF'+Lo2) are generated outside a band due to a double frequency conversion structure, unwanted spurious components (including 2IF'+Lo2) generated in the second frequency conversion unit 130 can be removed by the wideband filter unit 140.

Further, the unwanted spurious components generated in the first frequency conversion unit 110, which is outside the band of the IF' signal, may be completely removed by the narrow band filter unit 120.

As described above, even when the present invention constitutes a filter located in the final output stage as the wideband filter unit 140, the unwanted spurious components may not be generated in the wideband filter unit 140, because the unwanted spurious components is completely removed by the narrow band filter unit 120.

Since the present invention uses only one wideband filter unit 140 and one narrow band filter unit 120, a volume and a weight of the frequency up converter can be decreased, and costs can be reduced.

Figure 3:
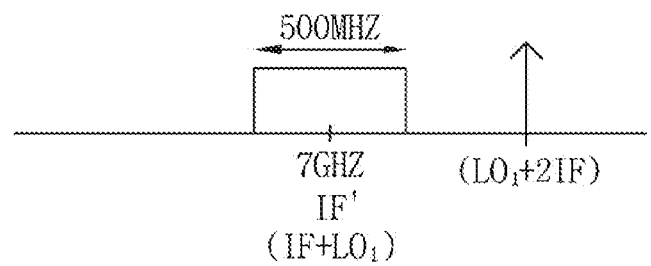
FIG. 3 is a diagram illustrating an IF' signal according to an embodiment of the present invention.
Figure 4:
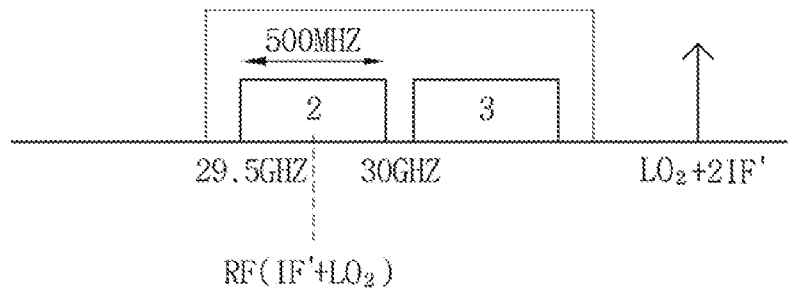
FIG. 4 is a diagram illustrating an RF signal according to an embodiment of the present invention.

Meanwhile, the frequency up converter 100 of FIG. 1 will be described in detail with reference to FIGS. 2 to 4 for better understanding.

FIG. 2 is a diagram for explaining sub-bands 1 to 4 constituting a wideband radio frequency (RF) band 20 used in a wideband and multi-band frequency up converter according to one embodiment of the present invention. FIG. 3 is a diagram illustrating an IF' signal according to an embodiment of the present invention. FIG. 4 is a diagram illustrating an RF signal according to an embodiment of the present invention.

Referring to FIG. 2, the RF band may include four sub-bands each having a bandwidth which is equal to or less than 500 MHz. The satellite transmitter in which use of a plurality of RF sub-bands selected among the sub-bands 1 to 4 is allowed may upconvert one among the IF bands including the 950 to the 1450 MHz band, the 950 to 1700 MHz band, the 950 to 1950 MHz band, etc. into the selected RF sub-band among the plurality of RF sub-bands.

Assume that the IF input to the frequency up converter 100 has a frequency band of 950 to 1450 MHz and a bandwidth of 500 MHz, and a passband of the narrow band filter unit 120 of the frequency up converter 100 has a center frequency of 7 GHz. In this case, the first local oscillator 112 may generate the IF' signal shown in FIG. 3. At this time, the control unit 160 may mix the changed frequency of the IF signal and the changed frequency of the first local signal so that the frequency of the generated IF' signal becomes the center frequency of the filter.

The control unit 160 may generate the first local frequency Lo1 so that the IF' signal (IF+Lo1) output from the first mixer 111 passes through the passband having the center frequency of 7 GHz. That is, the unwanted spurious components generated by the first mixer 111 can be completely removed by filtering the IF' signal using the narrow band filter unit 120.

Further, the IF' signal IF+Lo1 filtered in the narrow band filter 120 may be converted to the RF signal through the second frequency conversion unit 130. As shown in FIG. 4, since the spurious component LO2+2IF' generated in the second mixer 132 is outside the band, the spurious component Lo2+2IF' may be removed by being filtered out in the wideband filter unit 140.

Figure 5:
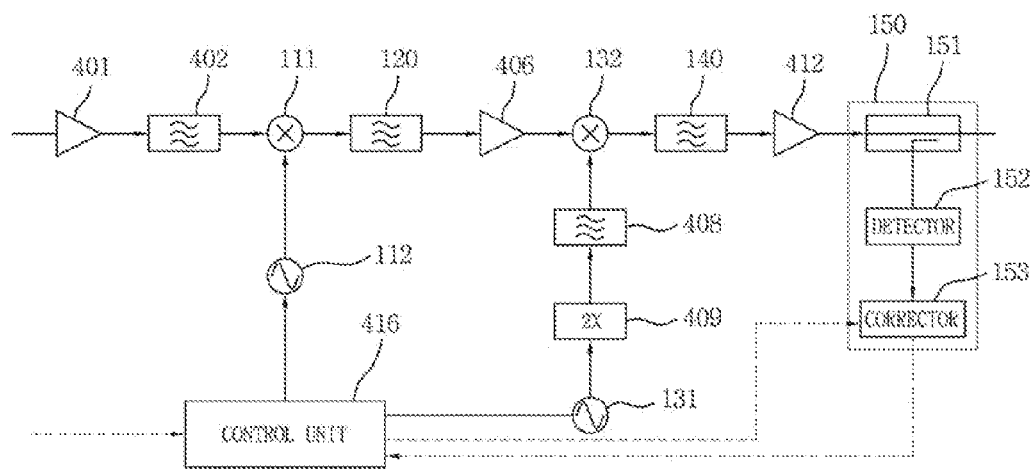
FIG. 5 is a functional block diagram illustrating a construction of a frequency up converter according to another embodiment of the present invention.

Meanwhile, one or more amplifiers for amplifying a gain and power, etc. and a filter for removing the spurious components according to the addition of the amplifier may be further included in the frequency up converter of FIG. 1 for high-output amplification. As another embodiment, the frequency up converter may be configured as shown in FIG. 5. Meanwhile, according to FIG. 5, amplifiers 401, 406, and 412, filters 402 and 408, and a multiplier 409 may be further included. Since the other components of FIG. 5 have the same construction and operation as the components of FIG. 1, descriptions thereof will be omitted.

Meanwhile, the control unit 160 may monitor an output level of the RF signal output from the wideband filter unit 140. Here, a coupler for extracting a signal of a predetermined ratio from the RF signal may be used in order to monitor the output level.

At this time, the coupler may be coupled to an RF output port using a predetermined ratio (for example, 1% when the RF is 30 GHz). The wideband frequency up converter of the present invention may output the RF frequency having various bands. As is well-known, an extraction ratio of one coupler may be varied according to the RF frequency.

Specifically, as the RF frequency increases, the predetermined ratio decreases. Accordingly, when one coupler is used in order to monitor the RF signal level of the wideband frequency up converter of the present invention, whether the corrected RF signal is normal may be determined by correcting the detected RF signal according to the RF frequency.

Hereinafter, a correction unit according to an embodiment of the present invention will be described with reference to FIGS. 1 to 5.

An operation of the correction unit 150 will be described with reference to FIGS. 1 to 5. The correction unit 150 may include a coupler 151, a detector 152, and a corrector 153.

The coupler 151 may couple the RF signal output from the wideband filter unit 140 using a ratio according to a predetermined condition. For example, the predetermined condition of the coupler 151 may be distributing a power value of 1% of the output level when the RF frequency is 30 GHz.

The detector 152 may output a first value corresponding to the RF signal of the predetermined ratio extracted by the coupler 151. Here, the first value may be a voltage value.

Specifically, the detector 152 may detect a voltage value corresponding to a power value of the RF signal of a detected specific ratio. The detector 152 may be a detector configured as a diode and a capacitor. The detector 152 may detect only a direct current component of a voltage corresponding to the power of the RF signal. Further, the detector 152 may further include a heat absorption diode, and detect a voltage value corresponding to the power value coupled using relationships between a temperature and the power and between the power and the voltage.

The corrector 153 may correct the first value output from the detector 152 as a second value according to the RF frequency. That is, the voltage value detected in the detector unit 152 may be corrected according to the RF frequency of the RF signal output at the RF output port. Here, the RF frequency may be automatically obtained by the modem 10, or may be known from the selection information of the RF band obtained by the external input.

Here, the corrector 153 may be variably implemented. For example, the corrector 153 may be implemented by hardware using an operational amplifier, or may be implemented by using a method of correcting a digitized voltage value in software.

The corrector 153 may correct the first value output from the detection unit 152 as the second value according to the RF frequency.

Meanwhile, the corrector 153 may perform the correction according to the control of the control unit 160.

The control unit 160 may define a correction reference according to the RF frequency. The control unit 160 may generate a control signal for correcting the voltage value detected according to the RF frequency when monitoring using the correction reference. Here, the correction reference may be an adjustment ratio of the voltage value detected in the detector 152 with respect to a reference RF frequency.

When the corrector 153 is implemented through the operational amplifier, the control unit 160 may transmit a gain value correction signal to the corrector 153. When the corrector 153 is implemented through the operational amplifier, the corrector 153 may correct the gain value by varying a resistance (an R value) according to the gain value correction signal, and output the corrected voltage value (the second value).

Meanwhile, when the corrector 153 is implemented through software, the corrector 153 may adjust a ratio of a voltage value of the first value according to the RF frequency of the first value through a mathematical calculation, and generate the corrected second value. In this case, the corrector 153 may be included in the control unit 160.

That is, the corrector 153 may obtain the corrected voltage value (the second value) by adjusting the ratio of the voltage value of the first value transmitted to the control unit 160 according to the RF frequency through the mathematical calculation in the control unit 160

The control unit 160 may monitor whether the output level is normal using the corrected voltage value (the second value).

Consequently, the present invention can remove the unwanted spurious components that result from the double frequency conversion structure, and precisely generate the output level of the RF signal by improving a function of monitoring the output level using the correction unit 150.

As described above, according to the present invention, the unwanted spurious components of the RF signal can be minimized by using the wideband as the passband of the single secondary filter in the double frequency conversion structure.

Further, in order to generate a wideband and multi-band signal, since a plurality of local oscillators, switching components, etc. are not needed due to varying and using an oscillation frequency of the local oscillator using the wideband local oscillator, the complexity of the construction of the frequency up converter can be improved, and miniaturization, power reduction and cost reduction can be achieved.

It will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

What is claimed is:

1. A wideband and multi-band frequency up converter, comprising:
    a first mixer configured to mix an intermediate frequency (IF) signal and a first local signal, and generate a generated IF signal;
    a narrow band filter configured to filter the generated IF signal using a predetermined passband, wherein, the narrow band filter which is a band pass filter (BPF) uses a frequency of the generated IF signal as a center frequency;
    a first local oscillator configured to generate the first local signal so that the IF signal passes the narrow band filter;
    a second local oscillator configured to generate a second local signal needed to convert the generated IF signal into a desired radio frequency (RF) band;
    a second mixer configured to mix the generated IF signal filtered in the narrow band filter and the second local signal, and generate an RF signal;
    a wideband filter configured to filter the generated RF signal, and use at least two RF bands as a passband; and
    a control unit configured to vary a frequency of the first local signal so that the generated IF signal corresponds to the passband of the narrow band filter, and vary a frequency of the second local signal needed to convert the generated IF signal passed through the narrow band filter into the desired RF band.

2. The wideband and multi-band frequency up converter of claim 1, further comprising:
    a coupler configured to extract a signal of a predetermined ratio from the RF signal, wherein, the predetermined ratio is varied according to the RF frequency of the RF signal;
    a detector configured to output a first value corresponding to the signal of the predetermined ratio extracted by the coupler; and
    a corrector configured to correct the first value output from the detector as a second value according to the RF frequency,
    wherein the control unit monitors an output level of the RF signal using the second value generated by the corrector.

3. The wideband and multi-band frequency up converter of claim 2, wherein the first value is a voltage, and the corrector comprises an amplifier and generates the second value by correcting a gain value of the amplifier according to the RF frequency.

4. The wideband and multi-band frequency up converter of claim 2, wherein the first value is a voltage, and the corrector generates the second value by adjusting the first value using a predetermined adjustment ratio according to the RF frequency.

* * * * *